(12) United States Patent
Aoki et al.

(10) Patent No.: US 10,784,480 B2
(45) Date of Patent: Sep. 22, 2020

(54) ASSEMBLED BATTERY

(71) Applicant: HITACHI AUTOMOTIVE SYSTEMS, LTD., Ibaraki (JP)

(72) Inventors: Sadayuki Aoki, Hitachinaka (JP); Kazunori Ojima, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 206 days.

(21) Appl. No.: 15/761,686

(22) PCT Filed: Sep. 20, 2016

(86) PCT No.: PCT/JP2016/077617
§ 371 (c)(1),
(2) Date: Mar. 20, 2018

(87) PCT Pub. No.: WO2017/057082
PCT Pub. Date: Apr. 6, 2017

(65) Prior Publication Data
US 2018/0351142 A1    Dec. 6, 2018

(30) Foreign Application Priority Data
Oct. 2, 2015    (JP) .................................. 2015-196375

(51) Int. Cl.
*H01M 2/10* (2006.01)
*H01M 2/04* (2006.01)
(Continued)

(52) U.S. Cl.
CPC ....... *H01M 2/1077* (2013.01); *H01M 2/0482* (2013.01); *H01M 2/1061* (2013.01);
(Continued)

(58) Field of Classification Search
None
See application file for complete search history.

(56) References Cited

U.S. PATENT DOCUMENTS

2008/0280194 A1   11/2008  Okada
2012/0003526 A1   1/2012   Kume et al.
(Continued)

FOREIGN PATENT DOCUMENTS

JP   2001-313018 A   11/2001
JP   2008-282582 A   11/2008
(Continued)

OTHER PUBLICATIONS

International Search Report for WO 2017/057082 A1, dated Nov. 8, 2016.
(Continued)

*Primary Examiner* — Lucas J. O'Donnell
(74) *Attorney, Agent, or Firm* — Volpe and Koenig, P.C.

(57) ABSTRACT

An assembled battery that can be easily assembled and that has high reliability is provided. An assembled battery includes secondary batteries with a flat prismatic shape that are stacked in a thickness direction (X-axis direction), spacer members that are stacked alternately with the secondary batteries, and side plates that extend in a stacking direction of the secondary batteries and face side surfaces of the spacer members along the stacking direction. The spacer member includes an engagement part to be engaged with the side plate in a manner that sliding is possible in the stacking direction (X-axis direction).

6 Claims, 14 Drawing Sheets

(51) Int. Cl.
  *H01M 2/20* (2006.01)
  *H01M 10/0585* (2010.01)
  *H01M 2/14* (2006.01)

(52) U.S. Cl.
  CPC ....... *H01M 2/206* (2013.01); *H01M 10/0585* (2013.01); *H01M 2/14* (2013.01); *H01M 2220/20* (2013.01)

(56) References Cited

U.S. PATENT DOCUMENTS

| | | |
|---|---|---|
| 2014/0154547 A1 | 6/2014 | Anderson et al. |
| 2015/0064541 A1* | 3/2015 | Noh .................... H01M 2/1061 429/156 |
| 2015/0064542 A1 | 3/2015 | Noh et al. |
| 2016/0006006 A1 | 1/2016 | Motokawa et al. |
| 2016/0149180 A1 | 5/2016 | Tokoo et al. |

FOREIGN PATENT DOCUMENTS

| | | |
|---|---|---|
| JP | 2013-225377 A | 10/2013 |
| JP | 2015-005362 A | 1/2015 |
| JP | 2015-050187 A | 3/2015 |
| WO | 2014/125807 A1 | 8/2014 |

OTHER PUBLICATIONS

Extended European Search Report dated May 9, 2019 for the European Patent Application No. 16851256.4.
Japanese Office Action dated Apr. 2, 2019 for the Japanese Patent Application No. 2017-543160.

* cited by examiner

ASSEMBLED BATTERY

TECHNICAL FIELD

The present invention relates to an assembled battery including a plurality of prismatic secondary batteries.

BACKGROUND ART

For example, an assembled battery including a plurality of prismatic secondary batteries is mounted on a vehicle such as an electric vehicle or a hybrid car. One known example is an assembled battery in which a plurality of prismatic batteries is stacked and fixed with fixing components (see PTL 1 below). In the assembled battery described in PTL 1, the fixing components consist of a pair of end plates disposed at opposite end surfaces of the stacked prismatic batteries, and metal bands whose ends are connected to the end plates to fix the stacked prismatic batteries in a compressed state.

CITATION LIST

Patent Literature

PTL 1: JP 2008-282582 A

SUMMARY OF INVENTION

Technical Problem

The assembled battery according to PTL 1 is obtained by a step of compressing a battery block, a step of connecting the metal bands, and a step of detaching the assembled battery from a jig (see PTL 1, the paragraphs [0043] to [0044]). In the assembled battery according to PTL 1, spacers are disposed each between battery cells, the end plates are disposed on opposite sides of the battery block in which the spacers and the prismatic batteries are stacked, and the end plates are pressed, and in this state, opposite ends of the metal bands is fixed to the end plate. Therefore, the assembling becomes complicated and the positions of the battery cells easily vary. This may result in the lower reliability of the assembled battery.

The present invention has been made in view of the above problem, and an object is to provide an assembled battery that can be easily assembled and that has high reliability.

Solution to Problem

To achieve the above object, an assembled battery of the present invention includes: secondary batteries with a flat prismatic shape that are stacked in a thickness direction; spacer members that are stacked alternately with the secondary batteries; and plate-shaped members that extend in a stacking direction of the secondary batteries and face side surfaces of the spacer members along the stacking direction, wherein the spacer member includes an engagement part to be engaged with the plate-shaped member in a manner that sliding is possible in the stacking direction.

Advantageous Effects of Invention

According to the invention, an assembled battery that can be easily assembled and that has high reliability can be provided.

DESCRIPTION OF EMBODIMENTS

Embodiments of an assembled battery according to the present invention are hereinafter described in detail with reference to the drawings.

First Embodiment

Figure 1:
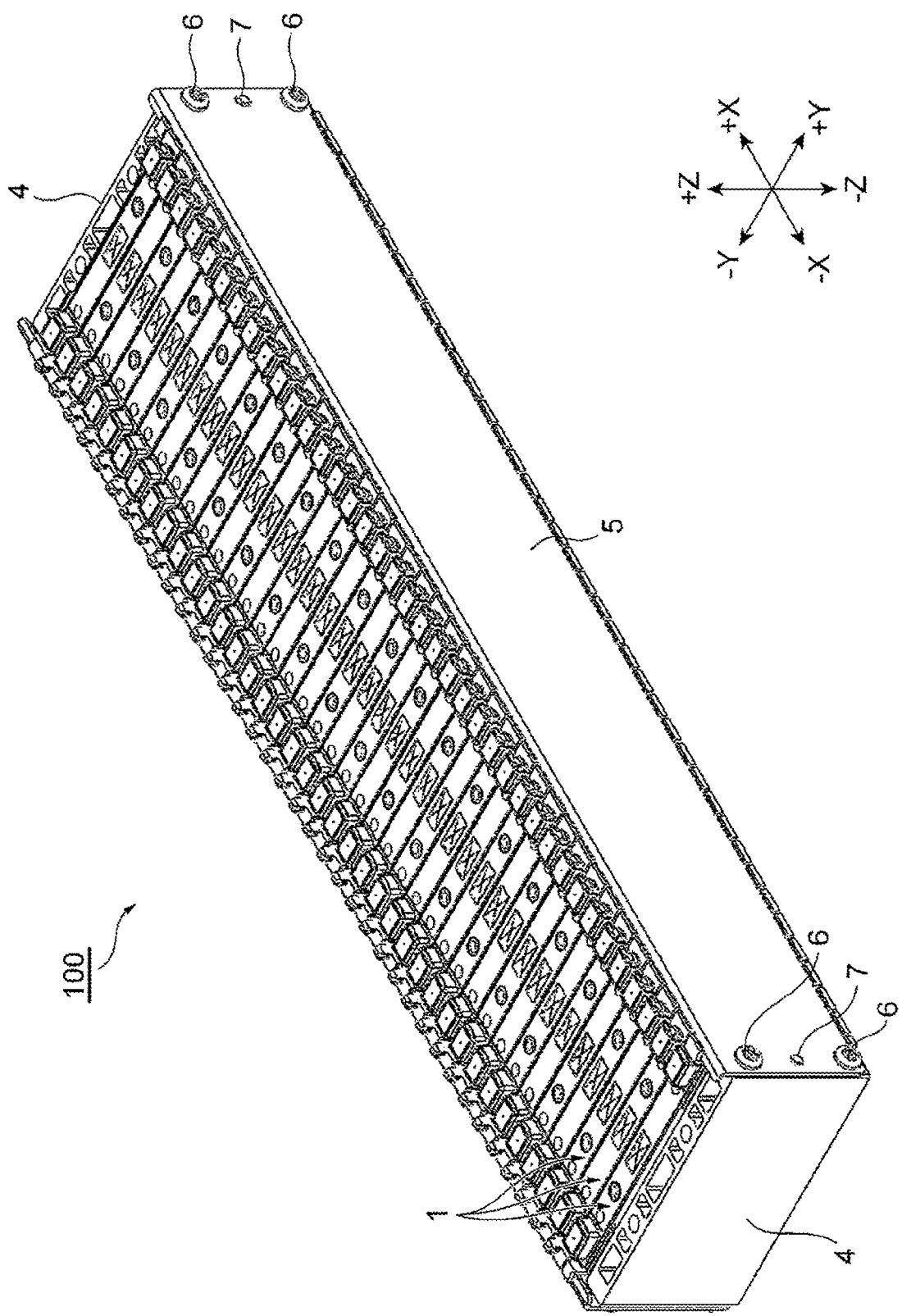
FIG. 1 is a perspective view illustrating an external appearance of an assembled battery according to a first embodiment of the present invention.
Figure 2:
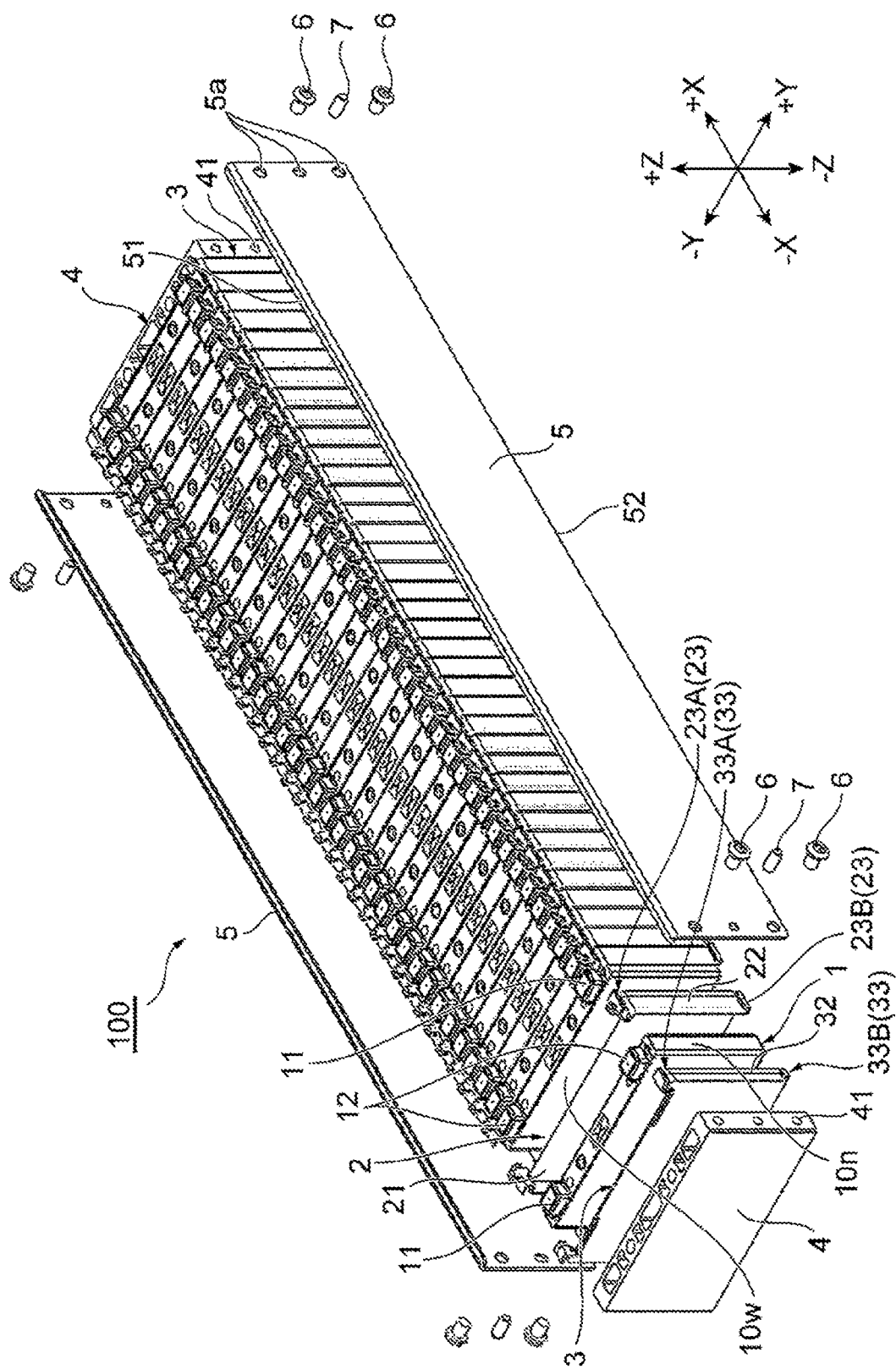
FIG. 2 is an exploded perspective view of the assembled battery illustrated in FIG. 1.

FIG. 1 is a perspective view illustrating an external appearance of an assembled battery 100 according to a first embodiment of the present invention. FIG. 2 is an exploded perspective view of the assembled battery 100 illustrated in FIG. 1. The assembled battery 100 according to the present embodiment is an assembled battery in which secondary batteries 1 each having a flat prismatic shape and spacer members 2 are alternately stacked in a thickness direction. In the description made below, an XYZ rectangular coordinate system may be employed. In the XYZ rectangular coordinate system, the X-axis direction represents a thickness direction of the secondary battery 1, the Y-axis direction represents a width direction of the secondary battery 1, and the Z-axis direction represents a height direction of the secondary battery 1.

The assembled battery 100 according to the present embodiment includes the secondary batteries 1, the spacer members 2, a pair of end spacer members 3, a pair of end plates 4, and a pair of side plates 5 corresponding to plate-shaped members. As will be described below in detail, in the assembled battery 100 according to the present embodiment, the spacer member 2 includes an engagement part 23 that is engaged with the side plate 5 corresponding to the plate-shaped member in a manner that sliding is possible in a stacking direction of the secondary batteries 1 (in the X-axis direction).

The secondary battery 1 has an approximately rectangular-parallelepiped shape that is flat and prismatic. The secondary battery 1 includes a positive electrode external terminal 11 and a negative electrode external terminal 12 at one end and the other end in a width direction of an upper surface. The secondary batteries 1 and the spacer members 2 are alternately disposed in the thickness direction (X-axis direction), and the secondary batteries 1 are stacked with the spacer member 2 held therebetween. The secondary batteries 1 are stacked inverted by 180° alternately so that the positive electrode external terminal 11 of one of two adjacent secondary batteries 1 and 1 comes next to the negative electrode external terminal 12 of the other secondary battery 1 in the stacking direction of the secondary batteries 1. The secondary batteries 1 are connected in series through a bus bar that is not shown.

Figure 3:
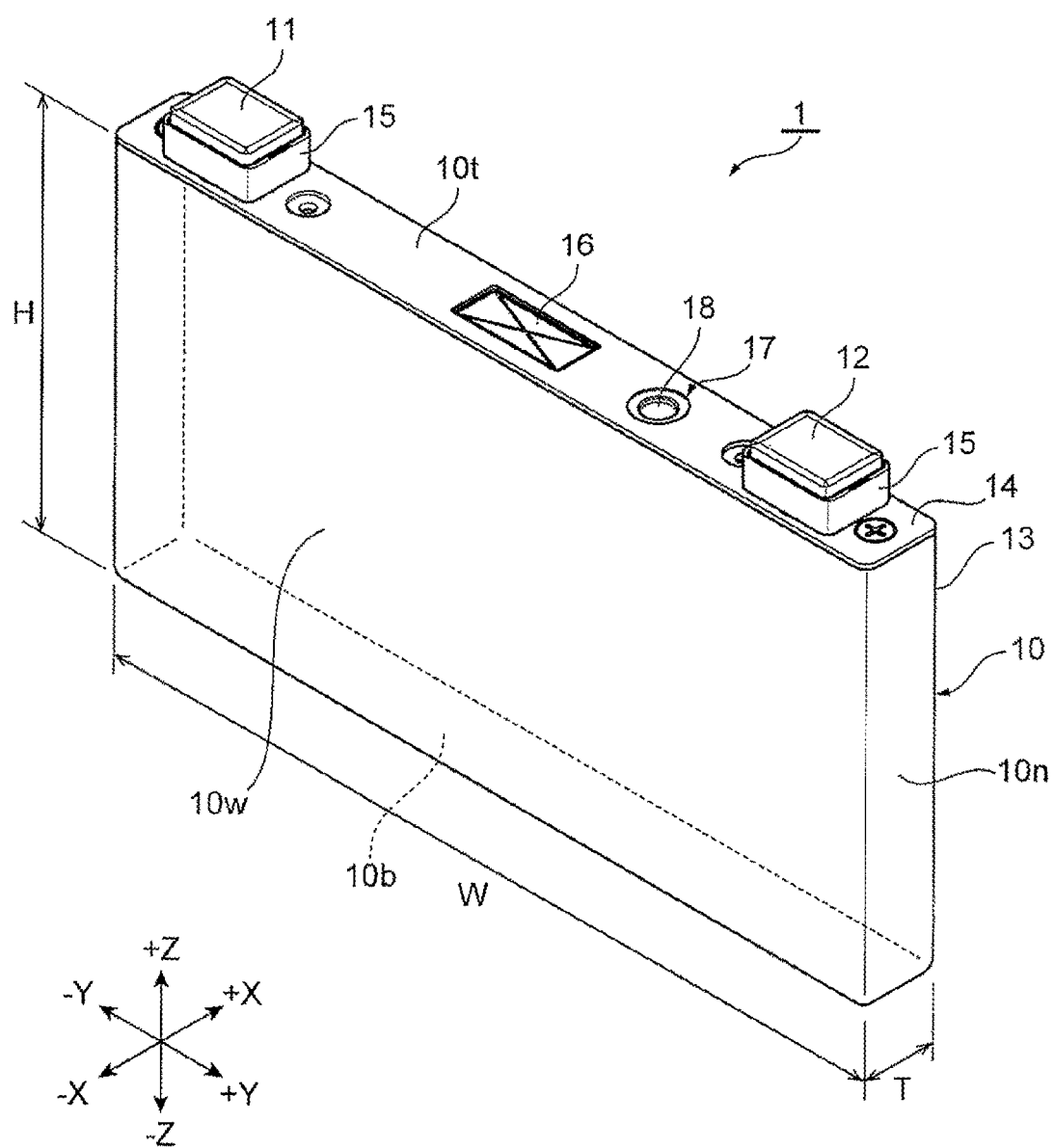
FIG. 3 is a perspective view illustrating an external appearance of the secondary battery illustrated in FIG. 2.

FIG. 3 is a perspective view illustrating an external appearance of the secondary battery 1 illustrated in FIG. 1 and FIG. 2. The secondary battery 1 includes, for example, a battery container 10 made of aluminum or aluminum alloy. The battery container 10 includes an upper surface 10*t* and a bottom surface 10*b*, each of which has an approximately rectangular shape whose long side coincides with the width direction, wide side surfaces 10*w* with a maximum area extending in the width direction, and narrow side surfaces 10*n* with a relatively small area extending in the thickness direction. When the assembled battery 100 is assembled, the secondary batteries 1 are stacked so that the wide side surfaces 10*w* of the adjacent secondary batteries 1 face each other through the spacer member 2.

The battery container 10 includes a battery can 13 with a bottomed prismatic cylindrical shape, and a battery lid 14 with a rectangular flat-plate shape. The battery lid 14 is bonded by, for example, laser welding so that an upper opening of the battery can 13 is sealed. Although not shown, the battery container 10 includes, for example, a wound body in which a positive electrode and a negative electrode with a rectangular band-like shape are wound with a separator having a rectangular band-like shape interposed therebetween, a pair of current collector plates for connecting each electrode of the wound body and each of the external terminals 11 and 12, an insulating member that fixes the pair of current collector plates to the battery lid 14, an insulating sheet that covers the wound body, and an electrolyte solution.

At one end and the other end in a longitudinal direction of the battery lid 14, that is, the width direction of the secondary battery 1 (Y-axis direction), the positive electrode external terminal 11 made of, for example, aluminum or aluminum alloy and the negative electrode external terminal 12 made of, for example, copper or copper alloy are provided. The positive electrode external terminal 11 and the negative electrode external terminal 12 are connected respectively to a positive electrode current collector plate and a negative electrode current collector plate inside the battery container 10 through the battery lid 14. Thus, the positive electrode external terminal 11 and the negative electrode external terminal 12 are connected to the positive electrode and the negative electrode included in the wound body, respectively. Between the external terminals 11 and 12, and the battery lid 14, a gasket 15 made of resin and having an insulating property is disposed. The gasket 15 insulates between the external terminals 11 and 12, and the battery lid 14, and seals a penetration hole provided to the battery lid 14.

The battery lid 14 includes a gas discharge valve 16 and a liquid pouring hole 17 at an intermediate part in the longitudinal direction. The gas discharge valve 16 is formed by thinning a part of the battery lid 14, for example, and when the internal pressure of the battery container 10 is increased over a set pressure due to some abnormality, the gas discharge valve 16 is opened to discharge gas and reduce the internal pressure. The liquid pouring hole 17 is a penetration hole opened through the battery lid 14, and is used when the electrolyte solution is poured into the battery container 10. After the electrolyte solution is poured, a liquid pouring stopper 18 is bonded by laser welding, for example, and thus the liquid pouring hole 17 is sealed.

With such a structure, the secondary battery 1 stores the electric power supplied from the outside through the positive electrode external terminal 11 and the negative electrode external terminal 12 into the wound body inside the battery container 10, or supplies the electric power stored in the wound body to the outside through the positive electrode external terminal 11 and the negative electrode external terminal 12.

The spacer member 2 is made of resin with an insulating property, for example. As illustrated in FIG. 2, the spacer member 2 includes a first part 21 that faces the wide side surfaces 10*w* of the secondary batteries 1, and second parts 22 that extend from the first part 21 and face at least a part of the narrow side surfaces 10*n* of the secondary batteries 1. The spacer member 2 includes a pair of second parts 22 in the width direction of the secondary battery 1. The first part 21 of the spacer member 2 connects between the pair of second parts 22.

The first part 21 of the spacer member 2 extends in the width direction (Y-axis direction) and the height direction (Z-axis direction) of the secondary battery 1. The first part 21 is a thin-plate part that is disposed between the wide side surfaces 10*w* of the two secondary batteries 1 that are adjacent in the stacking direction (X-axis direction), and is in contact with the wide side surfaces 10*w* of the both. The first part 21 of the spacer member 2 secures the insulating property by keeping the distance between the two secondary batteries 1 that are adjacent in the stacking direction, for example.

A width dimension of the first part 21 of the spacer member 2 can be made approximately equal to a width dimension W of the secondary battery 1. A height dimension of the first part 21 of the spacer member 2 can be made approximately equal to a height dimension H of the battery container 10 of the secondary battery 1. A thickness dimension of the first part 21 of the spacer member 2 is preferably 0.1 mm or more and 3.0 mm or less from the viewpoint of securing the strength and reducing the size of the assembled battery 100.

The second part 22 of the spacer member 2 is a thin-plate part that extends in the thickness direction (X-axis direction) and the height direction (Z-axis direction) of the secondary battery 1. The second part 22 is disposed between the battery container 10 and the side plate 5, and insulates between the battery container 10 and the side plate 5. In the present embodiment, the second part 22 of the spacer member 2 faces the narrow side surfaces 10n of the two secondary batteries 1 that are adjacent in the stacking direction (X-axis direction). In the present embodiment, the area of the second part 22 of the spacer member 2 that faces the narrow side surface 10n of one of the two secondary batteries 1 that are adjacent in the stacking direction and the area thereof that faces the narrow side surface 10n of the other secondary battery 1 are approximately equal.

The second part 22 of the spacer member 2 can have a thin and long rectangular plate-like shape in which, for example, the width dimension of the second part 22 that extends in the thickness direction of the secondary battery 1 is smaller than the height dimension thereof that extends in the height direction of the secondary battery 1, and the height direction of the secondary battery 1 is the longitudinal direction of the second part 22. The height dimension of the second part 22 of the spacer member 2 can be made approximately equal to the height dimension H of the battery container 10 of the secondary battery 1. Alternatively, the height dimension of the second part 22 of the spacer member 2 can be set larger than the height dimension H of the battery container 10 and parts that face the bottom surface 10b and the upper surface 10t of the battery container 10 may be provided. In this case, with the second parts 22, the battery container 10 can be held from above and below. The thickness dimension of the second part 22 of the spacer member 2 can be set larger than the thickness dimension of the first part 21.

The width dimension of the second part 22 of the spacer member 2 may be any dimension that allows the second part 22 extending from the first part 21 to face a part of the narrow side surface 10n of the secondary battery 1. Specifically, if a corner between the wide side surface 10w and the narrow side surface 10n of the secondary battery 1 has an R part with a curved surface shape, the width dimension of the second part 22 can be set so that an end in the width direction of the second part 22 extending from the first part 21 reaches a position facing the narrow side surface 10n over a border between the R part and the narrow side surface 10n.

When the assembled battery 100 is assembled, the battery containers 10 of the secondary batteries 1 are compressed by the first parts 21 of the spacer members 2 to homogenize the dimensions. In order to do this process, it is preferable that the width dimension of the second part 22 of the spacer member 2 is set so that the second parts 22 of the spacer members 2 that are adjacent in the stacking direction of the secondary batteries 1 have a gap therebetween. Therefore, the width dimension of the second part 22 of the spacer member 2 can be set to less than or equal to the thickness dimension T of the battery container 10. In a case of employing a labyrinth structure in which ends of the second parts 22 of the spacer members 2 that are adjacent in the stacking direction of the secondary batteries 1 are overlapped in the width direction of the secondary battery 1, the width dimension of the second part 22 of the spacer member 2 is larger than the thickness dimension T of the battery container 10. In this case, it is also preferable that the gap in the stacking direction of the secondary batteries 1 is formed between the second parts 22.

As illustrated in FIG. 2, the pair of end spacer members 3 is disposed at one end and the other end in the stacking direction of the secondary batteries 1 that are stacked in the thickness direction with the spacer member 2 interposed therebetween. The end spacer members 3 are made of an insulating resin in a manner similar to the spacer member 2. The end spacer member 3 is disposed between the end plate 4 and the secondary battery 1 and insulates between the end plate 4 and the secondary battery 1. The end spacer member 3 includes a first part 31 that faces approximately the entire wide surfaces 10w of the secondary batteries 1, and second parts 32 that extend from opposite ends in the width direction of the first part 31 to the thickness direction of the secondary battery 1, and each face approximately a half of the narrow side surface 10n. A surface of the end spacer member 3 that faces the end plate 4 is flat, and the second part 32 of the end spacer member 3 extends in the stacking direction of the spacer member 2 from the end plate 4 to the spacer member 2.

The pair of end plates 4 is a rectangular plate-shaped member that is made of a metal material such as stainless steel. The end plate 4 has a planar shape and a planar dimension that are approximately equal to those of the wide side surface 10w of the secondary battery 1. The pair of end plates 4 is disposed further outside of the pair of end spacer member 3 in the stacking direction of the secondary batteries 1. The pair of end plates 4 is stacked with the spacer member 2 interposed therebetween, and holds the secondary batteries 1, in which the pair of end spacer members 3 is disposed on opposite ends in the stacking direction, from opposite sides in the stacking direction. The pair of end plates 4 includes a plurality of bolt holes 41 on opposite sides in the width direction of the secondary battery 1.

The pair of side plates 5 is, for example, a band-like plate-shaped member that is made of a metal material such as stainless steel and that extends in the stacking direction of the secondary batteries 1, and faces side surfaces of the spacer members 2 in the stacking direction. The dimension in a short-side direction (Z-axis direction) of the side plate 5 is approximately equal to the height dimension H of the battery container 10 of the secondary battery 1. In the present embodiment, the side plate 5 includes ends 51 and 52 in the short-side direction that extend in the stacking direction of the spacer members 2. The end 51, which is on the battery lid 14 side in the height direction of the secondary battery 1, is bent approximately perpendicular to the inside in the width direction of the secondary battery 1. Opposite ends in the longitudinal direction (X-axis direction) of the side plate 5 are provided with penetration holes 5a at positions corresponding to the bolt holes 41 of the end plate 4. Through the penetration holes 5a, bolts 6 and 7 are inserted.

Figure 4:
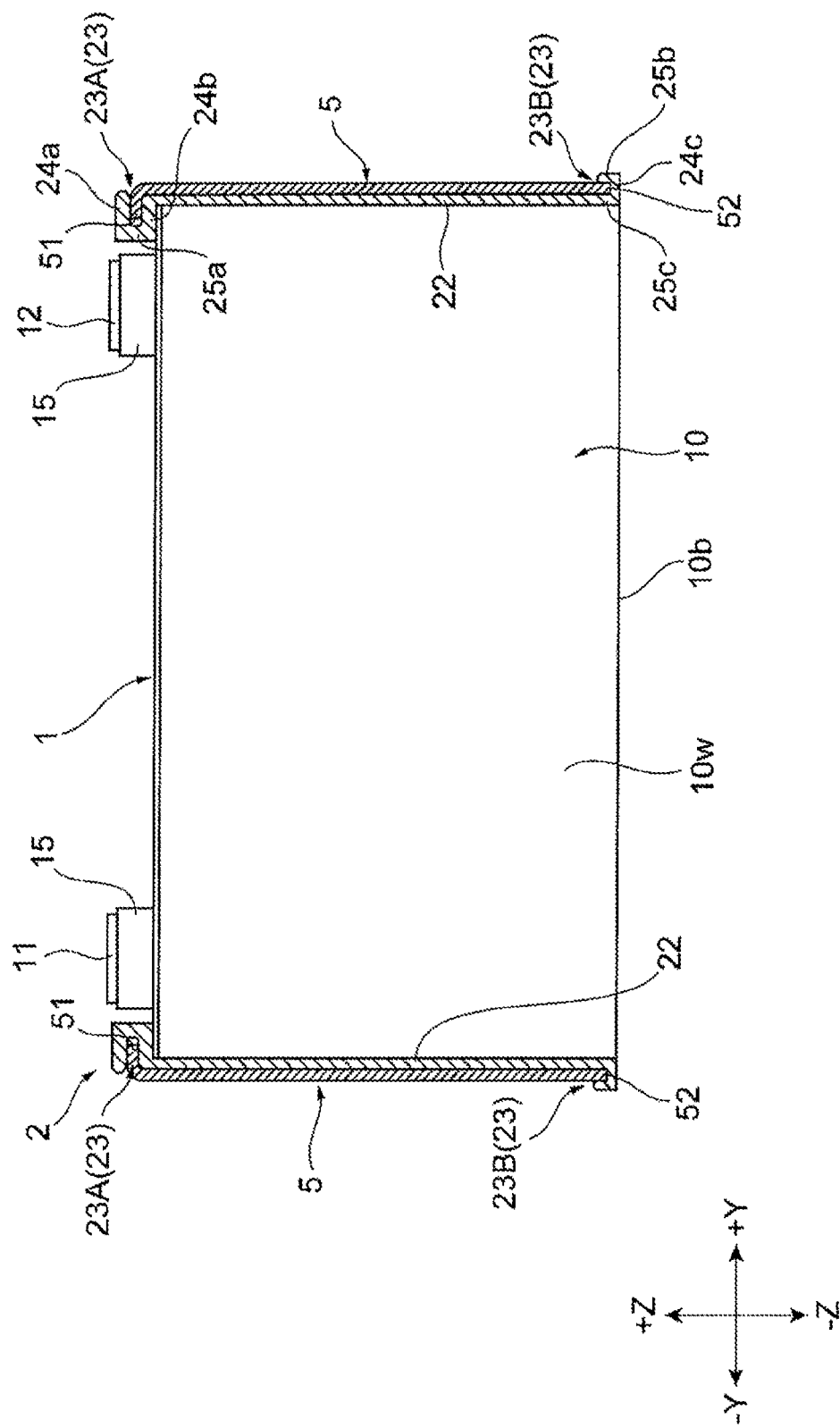
FIG. 4 is a cross-sectional view illustrating an engaged state between a spacer member and side plates illustrated in FIG. 2.

FIG. 4 is a cross-sectional view illustrating an engaged state between the spacer member 2 and the side plates 5 illustrated in FIG. 2. In FIG. 4, the first part 21 of the spacer member 2 illustrated in FIG. 2 is disposed to face the wide side surface 10w which is not shown on a back side of the secondary battery 1, and the second parts 22 of the spacer member 2 and the side plates 5 are cut along the wide side surface 10w on a front side of the secondary battery 1.

The spacer member 2 includes the engagement part 23 that is engaged with the side plate 5 corresponding to the plate-shaped member in a manner that sliding is possible in the stacking direction of the secondary batteries 1 (X-axis direction). In the present embodiment, the engagement part 23 is a groove-like concave part that extends in the stacking direction of the spacer members 2 with opposite ends open. In the present embodiment, the spacer member 2 includes a pair of engagement parts 23A and 23B as concave parts to be engaged with the pair of ends 51 and 52 of the side plates 5 corresponding to the plate-shaped member, the ends extending in the stacking direction.

The spacer member 2 includes the engagement part 23A formed to have a groove-like shape with the depth in the width direction of the secondary battery 1 at one end in the height direction of the second part 22 that is on the battery lid 14 side of the secondary battery 1. Thus, the end 51 of the side plate 5 corresponding to the plate-shaped member that extends in the stacking direction of the spacer members 2 and is bent to the inside in the width direction of the secondary battery 1 protrudes to the depth direction of the engagement part 23A and is engaged with the engagement part 23A.

The engagement part 23A includes wall parts 24a and 24b that intersect with the height direction of the secondary battery 1, and a wall part 25a that intersects with the width direction of the secondary battery 1. Thus, in the end 51 of the side plate 5 that is bent to the inside in the width direction of the secondary battery 1, one surface in the height direction of the secondary battery 1 faces the wall part 24a of the engagement part 23A, the other surface in the height direction of the secondary battery 1 faces the wall part 24b of the engagement part 23A, and an end surface in the width direction of the secondary battery 1 faces the wall part 25a of the engagement part 23A. The width of the engagement part 23A, that is, the gap between the wall part 24a and the wall part 24b can have the size of approximately the same degree as the thickness of the end 51 of the side plate 5.

The spacer member 2 includes the engagement part 23B formed to have a groove-like shape with the depth in the height direction of the secondary battery 1 at the other end in the height direction of the second part 22 that is on the bottom surface 10b side of the battery container 10. Thus, the end 52 of the side plate 5 corresponding to the plate-shaped member that extends in the stacking direction of the spacer members 2 extends straight to the height direction of the secondary battery 1 and is engaged with the engagement part 23B.

The engagement part 23B includes a wall part 24c that intersects with the height direction of the secondary battery 1, and wall parts 25b and 25c that intersect with the width direction of the secondary battery 1. Thus, in the end 52 of the side plate 5, an end surface in the height direction of the secondary battery 1 faces the wall part 24c of the engagement part 23B, one surface in the width direction of the secondary battery 1 faces the wall part 25b of the engagement part 23B, and the other surface in the width direction of the secondary battery 1 faces the wall part 25c of the engagement part 23B. The width of the engagement part 23B, that is, the gap between the wall part 25b and the wall part 25c can have the size of approximately the same degree as the thickness of the end 52 of the side plate 5.

As illustrated in FIG. 2, the end spacer member 3 includes engagement parts 33A and 33B which are similar to the engagement parts 23A and 23B of the spacer member 2 described above. That is, the end spacer member 3 includes the engagement parts 33A and 33B that are engaged with the side plate 5 corresponding to the plate-shaped member in a manner that sliding is possible in the stacking direction of the spacer members 2. Since the detailed structure of the engagement parts 33A and 33B of the end spacer member 3 is similar to that of the engagement parts 23A and 23B of the spacer member 2, the description is omitted.

An operation of the assembled battery 100 according to the present embodiment is hereinafter described.

The assembled battery 100 according to the present embodiment includes the secondary batteries 1 that have a flat prismatic shape and are stacked in the thickness direction, the spacer members 2 that are stacked alternately with the secondary batteries 1, and the side plates 5 that extend in the stacking direction of the secondary batteries 1 and face the side surfaces of the spacer members 2 extending in the stacking direction. The assembled battery 100 according to the present embodiment can be assembled through the following procedure, for example.

First, the ends 51 and 52 extending in the longitudinal direction of the pair of side plates 5, and the engagement parts 23 provided to the pair of second parts 22 of the spacer member 2 are engaged with each other. Here, the spacer member 2 includes the engagement part 23 that is engaged with the side plate 5 in a manner that sliding is possible in the stacking direction. Therefore, each of the ends 51 and 52 of the side plate 5 can be inserted to an opening end of the engagement part 23 of the spacer member 2 in the stacking direction from one end in the longitudinal direction, and by sliding the side plate 5, the ends 51 and 52 can be engaged with the engagement parts 23. Thus, the spacer members 2 can be stacked while being engaged with the pair of side plates 5, and the spacer members 2 can be engaged with the pair of side plates 5 in a manner that sliding is possible in the stacking direction.

Next, like the spacer members 2, the end spacer members 3 are engaged with opposite ends in the longitudinal direction of the ends 51 and 52 in the short-side direction of the pair of side plates 5 with which the engagement parts 23 of the spacer members 2 are engaged in a manner that sliding is possible in the stacking direction. Specifically, the ends 51 and 52 in the short-side direction of the side plate 5 are inserted to an opening end of the engagement part 33 of the end spacer member 3 in the stacking direction from one end in the longitudinal direction. Then, while the end spacer member 3 is slid in the longitudinal direction of the side plate 5, the engagement parts 33A and 33B of the end spacer member 3 and the ends 51 and 52 of the side plate 5 are engaged with each other. This enables the end spacer members 3 to be disposed at opposite ends of the spacer members 2 in the stacking direction.

Next, the secondary batteries 1 are disposed between the end spacer member 3 and the spacer member 2 and between the spacer members 2, and the pair of end plates 4 is disposed on opposite sides of the pair of end spacer members 3 on opposite sides in the stacking direction of the secondary batteries 1 and the spacer members 2 that are alternately stacked. Note that the secondary batteries 1 may be disposed at predetermined intervals in the thickness direction in advance and the spacer members 2 engaged with the pair of side plates 5 in advance may be disposed collectively between the secondary batteries 1. At the same time when the spacer members 2 are collectively disposed, the pair of end spacer members 3 engaged with the pair of side plates 5 in advance can be collectively disposed at opposite ends in the stacking direction of the secondary batteries 1 that are stacked alternately with the spacer members 2.

Therefore, since the spacer member 2 of the assembled battery 100 according to the present embodiment includes the engagement part 23 to be engaged with the side plate 5 in a manner that sliding is possible in the stacking direction, the assembling of the assembled battery 100 can be facilitated. Moreover, the variation in position of the secondary batteries 1 is suppressed by the spacer member 2 engaged with the side plate 5, and thus, the assembled battery with high reliability can be provided.

In the assembled battery 100 according to the present embodiment, the engagement part 23 of the spacer member 2 is a groove-shaped concave part that extends in the stacking direction with opposite ends open. Thus, the sliding between the spacer member 2 and the side plate 5 in the stacking direction is not interrupted. In addition, since the engagement part 23 of the spacer member 2 corresponding to the groove-shaped concave part is engaged with the side plate 5 corresponding to the plate-shaped member, the movement of the side plate 5 except in the direction where the groove-shaped concave part extends and the direction of the opening can be restricted, the displacement of the spacer member 2 can be suppressed, and the variation in position of the secondary batteries 1 can be suppressed.

In the assembled battery 100 according to the present embodiment, the engagement part 23 includes the wall parts 24a, 24b, and 24c that intersect with the height direction of the secondary battery 1. More specifically, the engagement part 23A on the battery lid 14 side of the secondary battery 1 includes the wall part 24a with a downward surface that faces the battery lid 14, and the wall part 24b with an upward surface that faces the downward surface of the wall part 24a. The wall part 24a and the wall part 24b intersect with the height direction of the secondary battery 1. The engagement part 23B on the bottom surface 10b side of the battery container 10 of the secondary battery 1 includes the wall part 24c with an upward surface that intersects with the height direction of the secondary battery 1 and faces the battery lid 14 side of the secondary battery 1.

Therefore, the upward movement of the side plate 5 in the height direction of the secondary battery 1 from the bottom surface 10b of the battery container 10 to the battery lid 14 is restricted by the wall part 24a of the engagement part 23A of the spacer member 2 that faces one surface of the end 51 on the battery lid 14 side of the side plate 5 that faces the direction. In addition, the downward movement of the side plate 5 in the height direction of the secondary battery 1 from the battery lid 14 to the bottom surface 10b of the battery container 10 is restricted by the wall part 24b of the engagement part 23A and the wall part 24c of the engagement part 23B of the spacer member 2. This is because the wall part 24b faces one surface of the end 51 of the side plate 5 on the battery lid 14 side, the one surface facing downward in the height direction, and the wall part 24c faces an end surface of the end 52 of the side plate 5 on the bottom surface 10b side of the battery container 10, the end surface facing downward in the height direction.

In the assembled battery 100 according to the present embodiment, the engagement part 23 includes the wall parts 25a, 25b, and 25c that intersect with the width direction of the secondary battery 1. More specifically, the engagement part 23A on the battery lid 14 side of the secondary battery 1 includes the wall part 25a that intersects with the width direction of the secondary battery 1 and faces the end 51 of the side plate 5 that is bent in the width direction of the secondary battery 1. In addition, the engagement part 23B on the bottom surface 10b side of the battery container 10 of the secondary battery 1 includes the wall part 25b that faces an external side surface of the end 52 of the side plate 5 on the bottom surface 10b side of the battery container 10 and the wall part 25c that faces an internal side surface of the end 52, and the wall parts 25b and 25c intersect with the width direction of the secondary battery 1.

Therefore, the movement of the side plate 5 to the inside in the width direction of the secondary battery 1 is restricted by the wall part 25a of the engagement part 23A that faces the end 51 of the side plate 5 and the wall part 25c of the engagement part 23B that faces an inner side surface of the end 52 of the side plate 5. In addition, the movement of the side plate 5 to the outside in the width direction of the secondary battery 1 is restricted by the wall part 25b of the engagement part 23B that faces the external side surface of the end 52 of the side plate 5.

The engagement part 23A is formed to have a groove-like shape with the depth in the width direction of the secondary battery 1, and the side plate 5 corresponding to the plate-shaped member has the end 51 extending in the stacking direction. The end 51 protrudes to the depth direction of the engagement part 23A and is engaged with the engagement part 23A. Thus, the end 51 of the side plate 5 can be inserted from an opening of the engagement part 23A in the width direction of the secondary battery 1, and the movement of the side plate 5 excluding one side in the width direction of the secondary battery 1 corresponding to the opening direction and the extending direction of the groove-shaped engagement part 23A can be restricted by the engagement part 23A.

In addition, the spacer member 2 includes the pair of engagement parts 23A and 23B corresponding to the concave parts to be engaged with the pair of ends 51 and 52 that extends in the stacking direction of the secondary batteries 1 in the side plate 5 corresponding to the plate-shaped member. Thus, both the ends 51 and 52 in the short-side direction of the side plate 5 can be held by the pair of engagement parts 23A and 23B corresponding to the concave parts, and the displacement of the side plate 5 can be prevented more effectively.

As described above, the spacer members 2 and the end spacer members 3, and the side plates 5 are slidably engaged with each other and then, the spacer members 2 and the secondary batteries 1 are alternately stacked, and after that, the secondary batteries 1 are pressed and fastened in the stacking direction. Specifically, the secondary batteries 1 are stacked alternately with the spacer members 2, and the end spacer members 3 are disposed at opposite ends in the stacking direction and the pair of end plates 4 is disposed further on the outside of the end spacer members 3. After that, the compressive force is applied to reduce the distance between the pair of end plates 4, and the secondary batteries 1 stacked with the spacer members 2 and the end spacer members 3 interposed therebetween are compressed until the dimension in the stacking direction becomes a predetermined dimension.

Here, the spacer member 2 and the end spacer member 3 include the engagement parts 23 and 33 to be engaged with the side plate 5 in a manner that the sliding is possible in the stacking direction of the secondary batteries 1. Therefore, as the thickness of the secondary batteries 1 becomes smaller by the compression, the spacer members 2 and the end spacer members 3 slide in the stacking direction of the secondary batteries 1 while the engagement with the side plate 5 is maintained. Accordingly, the engagement between the spacer member 2 and the end spacer member 3, and the side plate 5 does not interrupt the application of the compressive force to the secondary batteries 1. In addition, the displacement of the spacer members 2 and the end spacer members 3 can be prevented, the variation in position of the secondary batteries 1 can be suppressed, and the assembled battery with high reliability can be provided.

Next, the bolts 6 and 7 are inserted to the penetration holes 5a of the pair of side plates 5 that faces the side surfaces of the pair of second parts 22 of the spacer member 2 in the stacking direction, and the bolts 6 and 7 are screwed into the bolt holes 41 of the pair of end plates 4. The pair of end plates 4 and the pair of side plates 5 are fastened and fixed. Thus, in the assembled battery 100, the secondary batteries 1 with a flat prismatic shape and the spacer members 2 are alternately stacked in the thickness direction and the pair of end spacer members 3 is disposed at opposite ends in the stacking direction of the secondary batteries. Furthermore, the pair of end plates 4 is disposed on opposite sides in the stacking direction, and the pair of side plates 5 is disposed to face a pair of side surfaces in the stacking direction of the spacer members 2, and the secondary batteries 1 with the compressive force applied are held and fastened by the pair of end plates 4.

Thus, the assembled battery 100 illustrated in FIG. 1 is completed. After that, although not shown, the secondary batteries 1 are connected in series with each other by a bus bar, a voltage detection board for measuring the voltage of the secondary batteries 1 is disposed thereon, and furthermore, the voltage detection board is covered with a cover. With a structure as above, the assembled battery 100 can store the power supplied from the outside in the secondary batteries 1, or supply the power stored in the secondary batteries 1 to the outside.

As described above, according to the assembled battery 100 of the present embodiment, the assembled battery that can be easily assembled and that has high reliability can be provided. The structure of the assembled battery according to the present invention is not limited to the structure of the assembled battery 100 described in the present embodiment.

Figure 5:
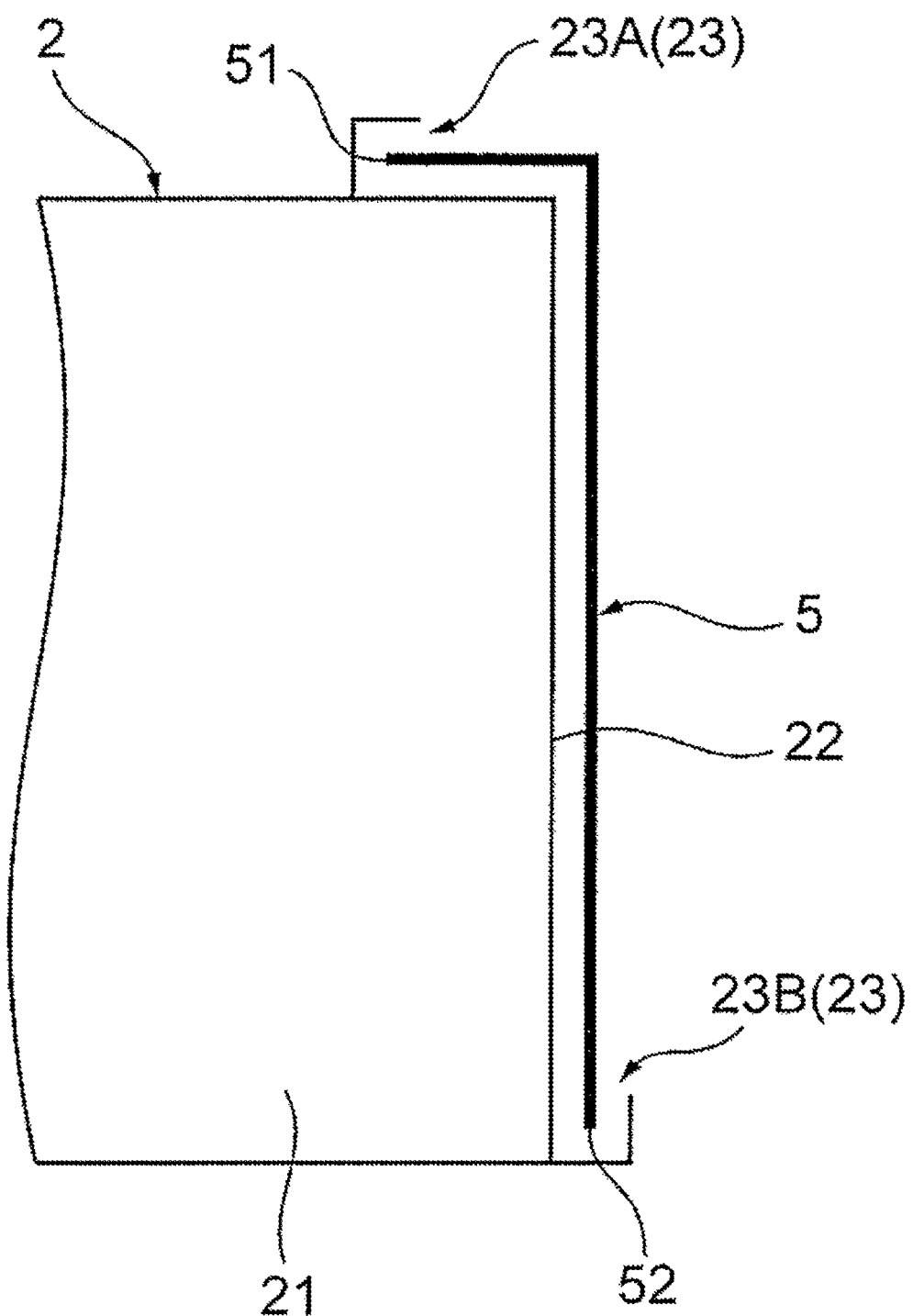
FIG. 5 is a schematic cross-sectional view illustrating an engaged state between the spacer member and the side plate illustrated in FIG. 4.

FIG. 5 is a schematic cross-sectional view illustrating an engaged state between the spacer member 2 and the side plate 5 of the assembled battery 100 according to the present embodiment. For example, in the structure described in the preset embodiment, as illustrated in FIG. 5, the end 51 of the side plate 5 that extends in the stacking direction of the secondary batteries 1 and protrudes to the width direction of the secondary battery 1 is engaged with the engagement part 23A with a groove-like shape of the spacer member 2. However, a structure other than this structure can be employed.

Figure 6:
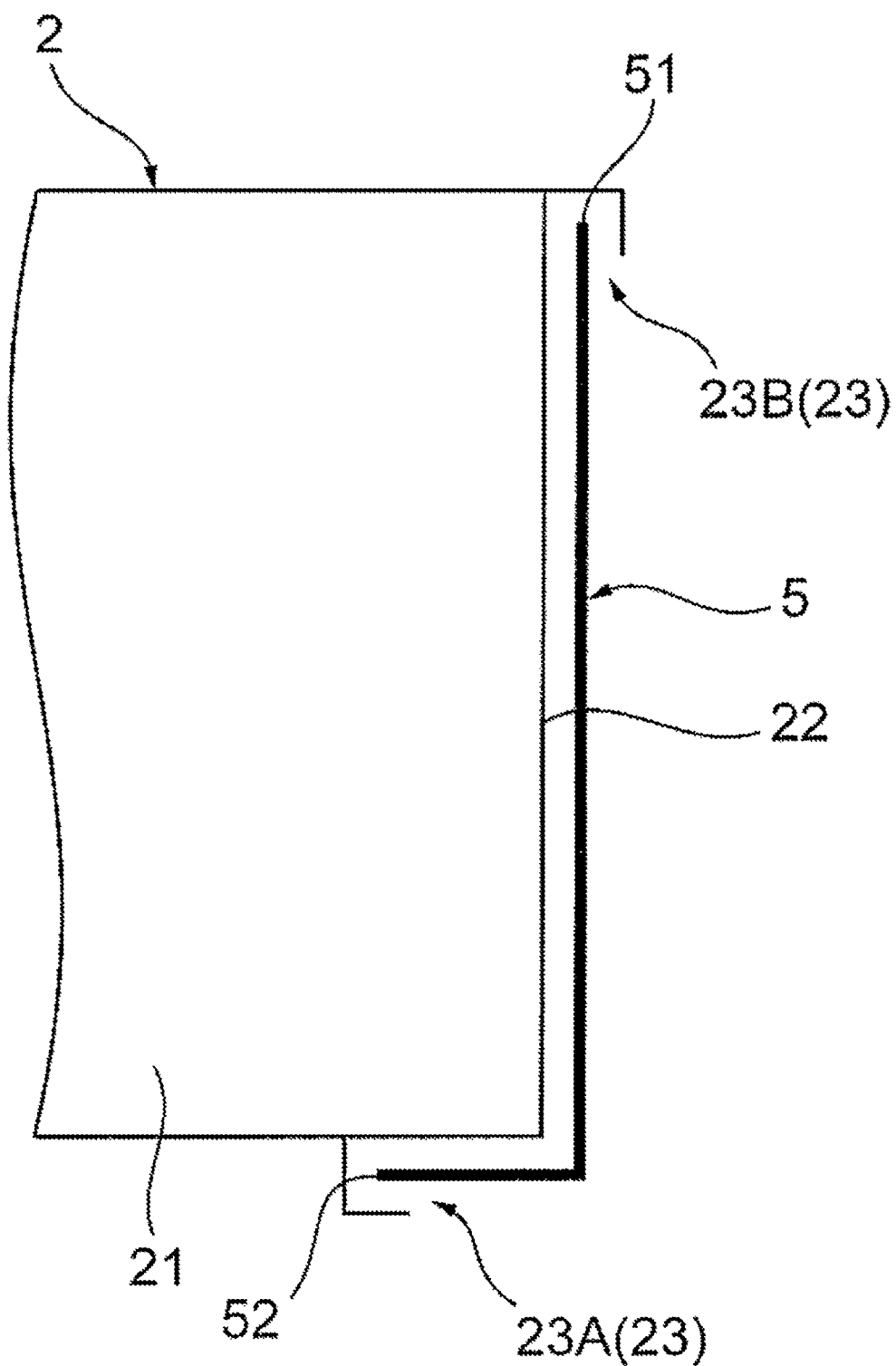
FIG. 6 is a schematic cross-sectional view illustrating a modification of the spacer member and the side plate illustrated in FIG. 5.

FIG. 6 is a schematic cross-sectional view illustrating a modification of the engaged state between the spacer member 2 and the side plate 5 of the assembled battery 100 according to the present embodiment illustrated in FIG. 5. For example, in the assembled battery 100 described above, the positional relation between the ends 51 and 52 of the side plate 5 and the engagement parts 23A and 23B may be opposite with respect to the height direction of the secondary battery 1 as illustrated in FIG. 6.

Although not shown, the engagement part of the spacer member 2 may be a convex part that extends in the stacking direction of the secondary batteries 1. In this case, the side plate 5 corresponding to the plate-shaped member includes a concave part that is engaged with the convex part of the spacer member 2 in a manner that sliding is possible in the stacking direction of the secondary batteries 1. Thus, the spacer member 2 includes the engagement part that is engaged with the side plate 5 in a manner that sliding is possible in the stacking direction of the secondary batteries 1, which is similar to the assembled battery 100 according to the present embodiment, and an effect similar to that of the assembled battery 100 according to the present embodiment can be obtained.

Second Embodiment

Figure 7:
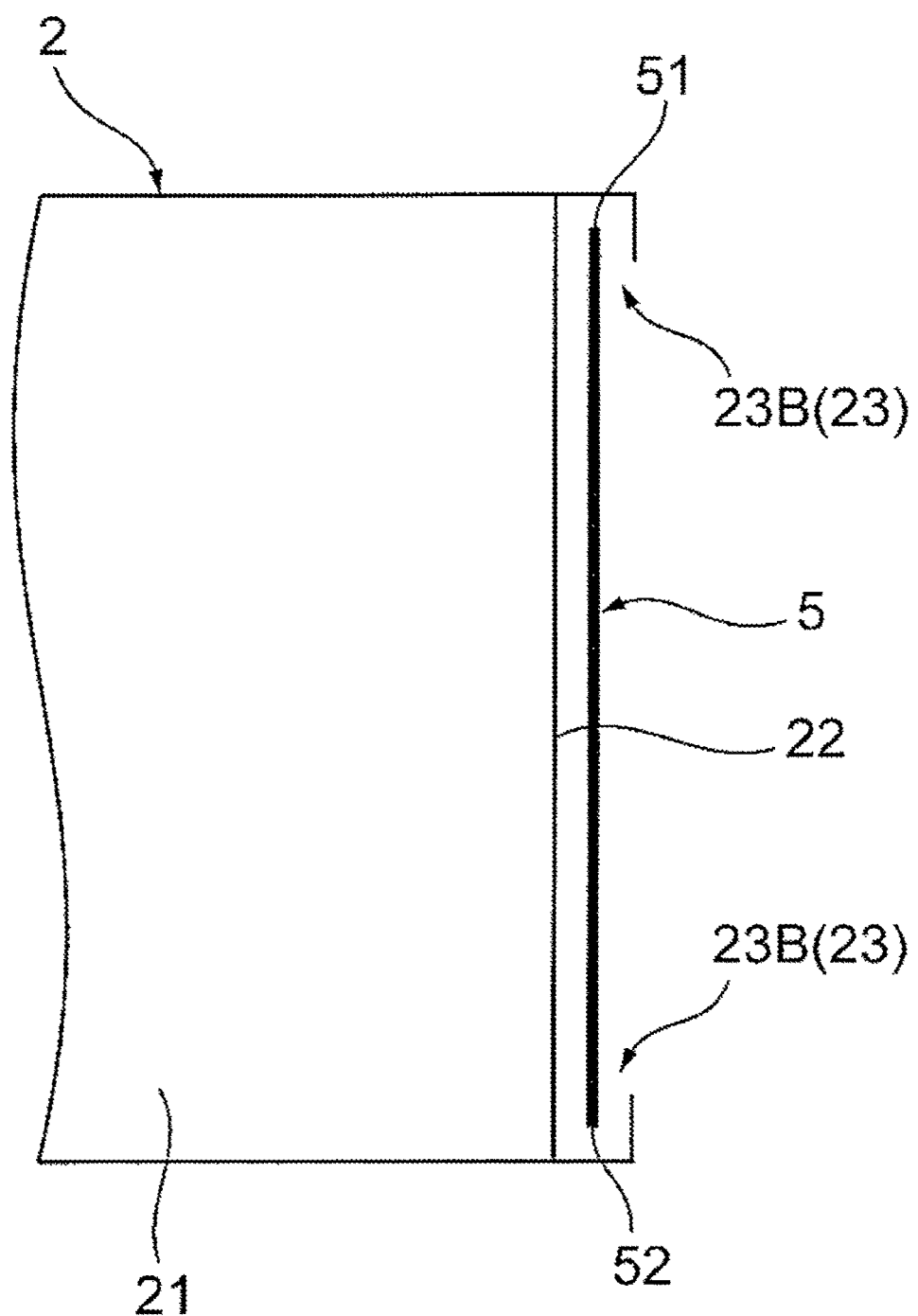
FIG. 7 is a schematic cross-sectional view of an assembled battery according to a second embodiment of the present invention, which corresponds to FIG. 5.

Next, an assembled battery according to a second embodiment of the present invention is described using FIG. 7 with reference to FIG. 1 to FIG. 4. FIG. 7 is a schematic cross-sectional view illustrating an engaged state between the spacer member 2 and the side plate 5 in the assembled battery according to the present embodiment, and corresponds to FIG. 5 illustrating the assembled battery 100 according to the first embodiment.

The assembled battery according to the present embodiment is different from the assembled battery 100 according to the first embodiment illustrated in FIG. 5 in the following points of the spacer member 2 and the side plate 5 illustrated in FIG. 7. The first point is that the engagement part 23 on the battery lid 14 side of the spacer member 2 in the height direction of the secondary battery 1 is the engagement part 23B corresponding to a groove-shaped concave part with the depth in the height direction of the secondary battery 1. The second point is that the ends 51 and 52 of the side plate 5 in the short-side direction on the battery lid 14 side are not bent in the width direction of the secondary battery 1, and the side plate 5 is formed to have a flat-plate shape not having a part that protrudes to the width direction of the secondary battery 1. The other points of the assembled battery according to the present embodiment are the same as those of the assembled battery 100 according to the first embodiment described above; therefore, the description of the same components is omitted by denoting those components with the same reference signs.

In the assembled battery according to the present embodiment, like in the assembled battery 100 according to the first embodiment, the spacer member 2 includes the engagement parts 23B and 23B to be engaged with the side plate 5 corresponding to the plate-shaped member in a manner that sliding is possible in the stacking direction of the secondary batteries 1. Therefore, by the assembled battery according to the present embodiment, the assembled battery that can be easily assembled and that has high reliability, which is similar to the assembled battery 100 according to the first embodiment, can be provided. Furthermore, since the side plate 5 does not include the part that protrudes to the width direction of the secondary battery, the dimension of the assembled battery in the width direction of the secondary battery 1 can be minimized and thus, the weight of the assembled battery can be reduced.

Third Embodiment

Figure 8:
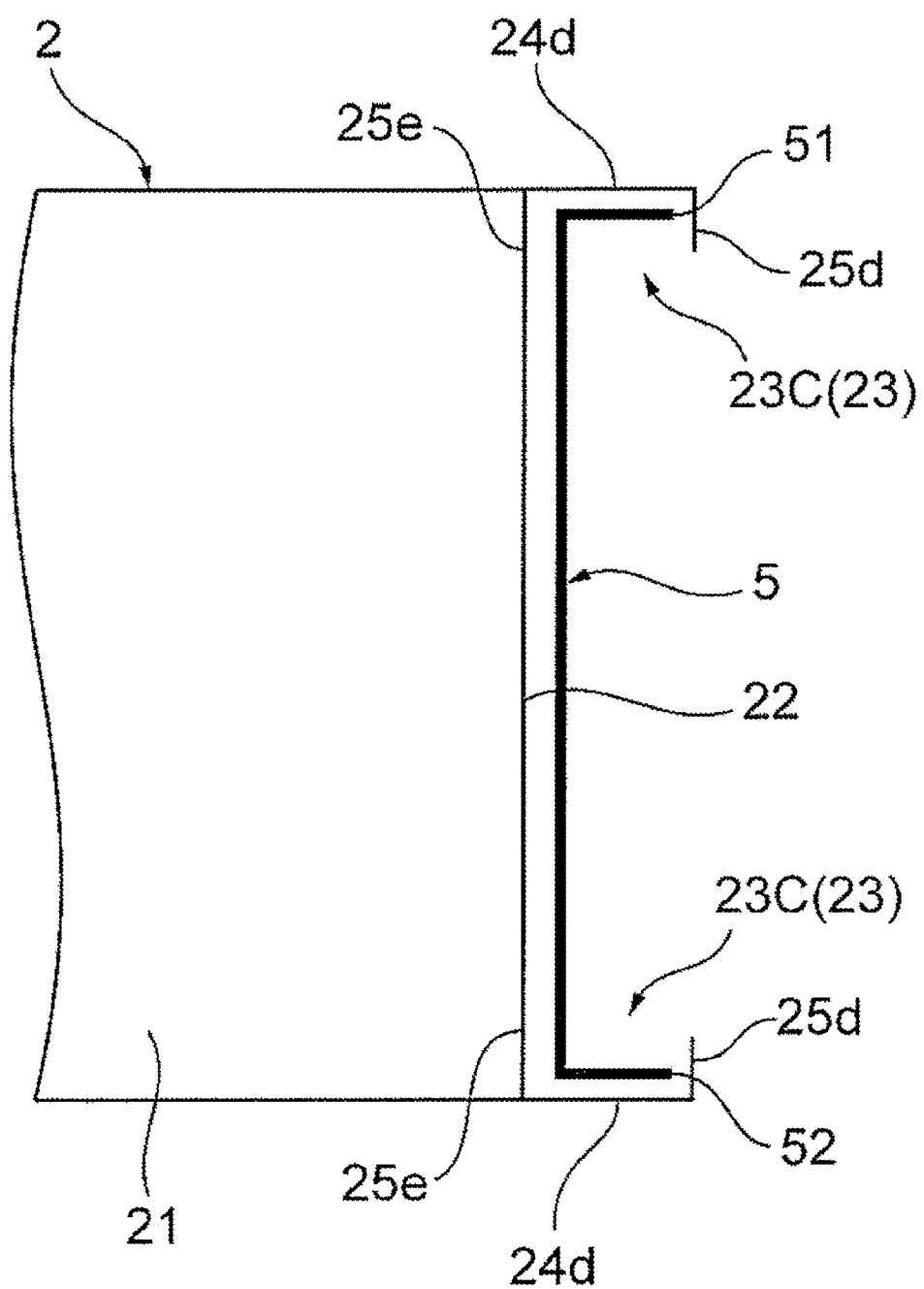
FIG. 8 is a schematic cross-sectional view of an assembled battery according to a third embodiment of the present invention, which corresponds to FIG. 5.

Next, an assembled battery according to a third embodiment of the present invention is described using FIG. 8 with reference to FIG. 1 to FIG. 4. FIG. 8 is a schematic cross-sectional view illustrating an engaged state between the spacer member 2 and the side plate 5 in the assembled battery according to the present embodiment, and corresponds to FIG. 5 illustrating the assembled battery 100 according to the first embodiment.

The assembled battery according to the present embodiment is different from the assembled battery 100 according to the first embodiment illustrated in FIG. 5 in the following points of the spacer member 2 illustrated in FIG. 8. The first point is that both the ends 51 and 52 of the side plate 5 in the height direction of the secondary battery 1 are bent approximately perpendicular to the outside in the width direction of the secondary battery 1. The second point is that engagement parts 23C and 23C, which are groove-shaped concave parts with the depth in the height direction of the secondary battery 1 and have the width that is approximately equal to the length of the bent part of the ends 51 and 52 of the side plate 5, are formed at both ends of the spacer member 2 in the height direction of the secondary battery 1. The other points of the assembled battery according to the present embodiment are the same as those of the assembled battery 100 according to the first embodiment described above; therefore, the description of the same components is omitted by denoting those components with the same reference signs.

The width of the engagement part 23C in the width direction of the secondary battery 1 is larger than the thickness of the side plate 5. In addition, in a manner similar to the engagement part 23B of the assembled battery 100 according to the first embodiment illustrated in FIG. 4, the engagement part 23C includes wall parts 24d that restricts the movement of the side plate 5 in the height direction of the secondary battery 1, and wall parts 25d and 25e that restrict the movement of the side plate 5 in the width direction of the secondary battery 1.

One of a pair of wall parts 24d of the pair of engagement parts 23C faces an upper surface of the end 51 of the side plate 5 that is bent, and the other faces a lower surface of the end 52 of the side plate 5 that is bent. One of a pair of wall parts 25d of the pair of engagement parts 23C faces the end 51 of the side plate 5 that is bent, and the other faces the end 52 of the side plate 5 that is bent. Furthermore, a pair of wall parts 25e of the pair of engagement parts 23C faces the internal side surface of the side plate 5.

Thus, the movement of the side plate 5 in the height direction of the secondary battery 1 is restricted by the pair of wall parts 24d of the pair of engagement parts 23C of the spacer member 2, and the movement of the side plate 5 in the width direction of the secondary battery 1 is restricted by the pair of wall parts 25d and the pair of wall parts 25e of the pair of engagement parts 23C of the spacer member 2. In addition, the engagement part 23C does not include the wall part that intersects with the stacking direction of the secondary batteries 1, and is open in the stacking direction of the secondary batteries 1. Therefore, the engagement part 23C of the spacer member 2 is engaged with the side plate 5 in a manner that sliding is possible in the stacking direction of the secondary batteries 1.

In the assembled battery according to the present embodiment, like in the assembled battery 100 according to the first embodiment, the spacer member 2 includes the engagement parts 23C and 23C to be engaged with the side plate 5 corresponding to the plate-shaped member in a manner that the sliding is possible in the stacking direction of the secondary batteries 1. Therefore, by the assembled battery according to the present embodiment, the assembled battery that can be easily assembled and that has high reliability, which is similar to the assembled battery 100 according to the first embodiment, can be provided. In addition, since both the ends 51 and 52 in the short-side direction of the side plate 5 are bent in the width direction of the secondary battery 1, the geometrical moment of inertia of the side plate 5 is increased to improve the strength; thus, the assembled battery with higher reliability can be provided.

Note that the structure of the assembled battery according to the present invention is not limited to the structure in which the spacer member 2 and the side plate 5 illustrated in FIG. 8 have the engagement parts 23C and the ends 51 and 52 with the same structure in both the ends in the height direction of the secondary battery 1. FIG. 9 to FIG. 12 illustrate modifications of the spacer member 2 and the side plate 5 illustrated in FIG. 8.

Figure 9:
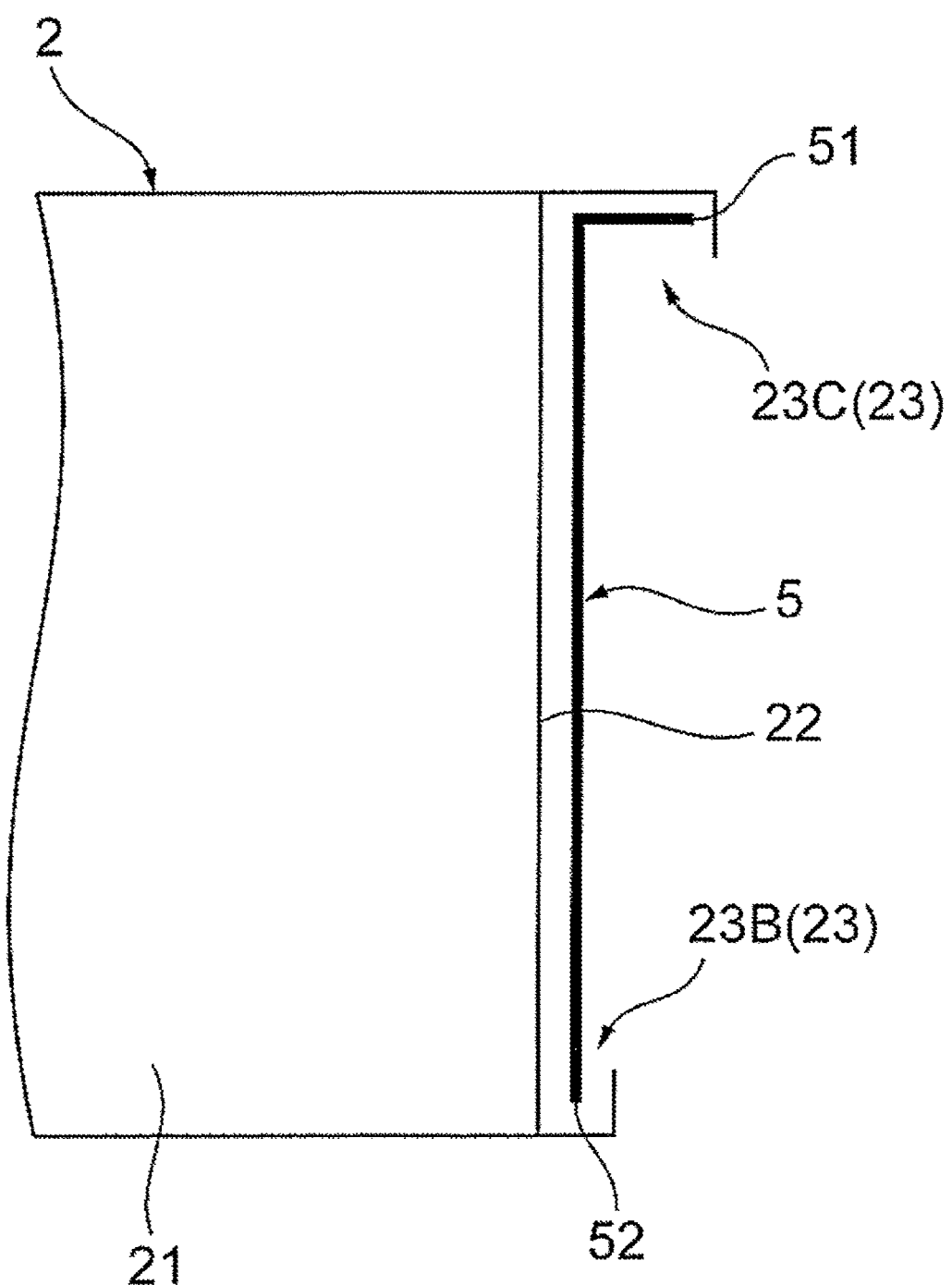
FIG. 9 is a schematic cross-sectional view illustrating a modification of the spacer member and the side plate illustrated in FIG. 8.
Figure 10:
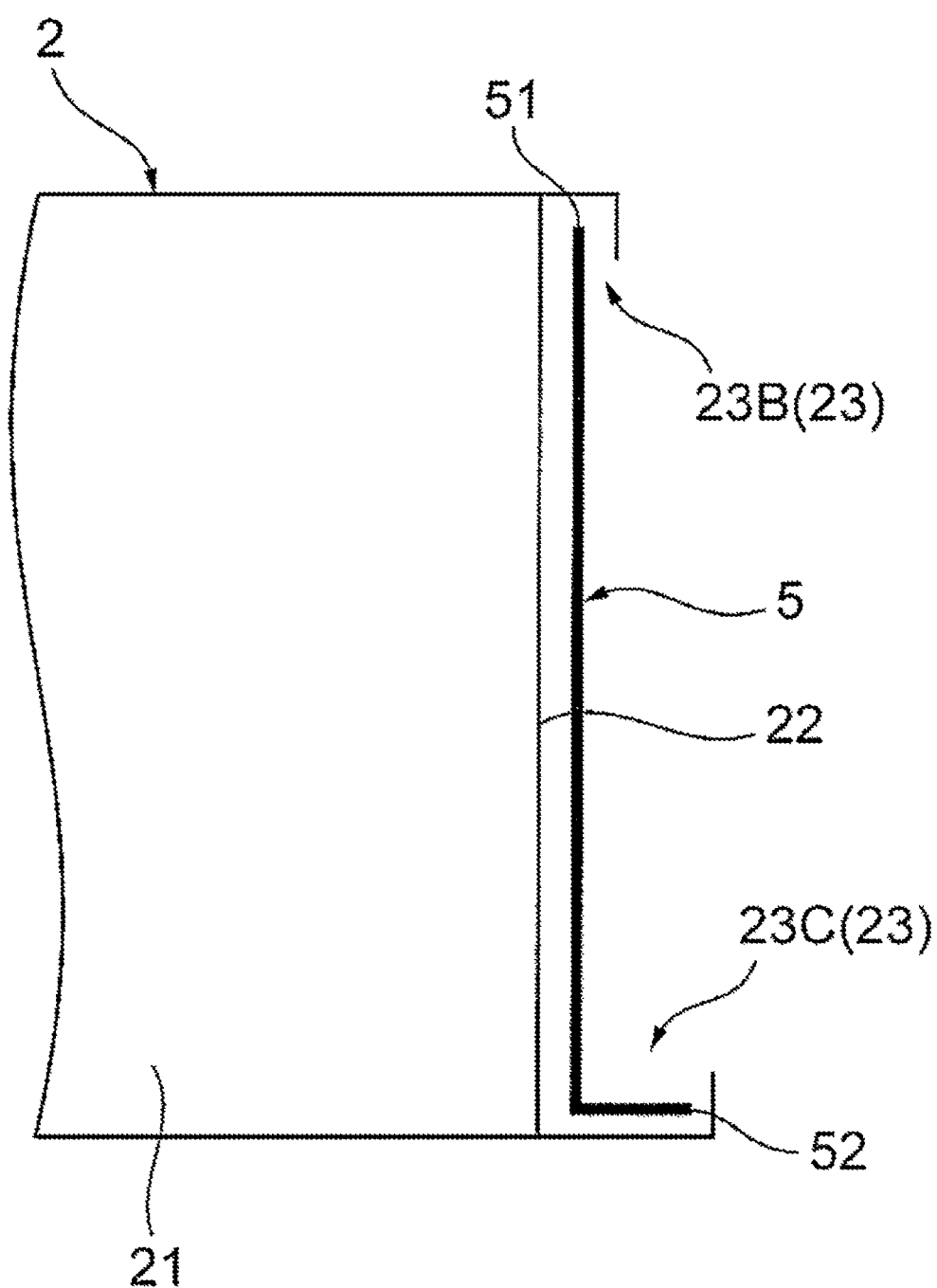
FIG. 10 is a schematic cross-sectional view illustrating a modification of the spacer member and the side plate illustrated in FIG. 8.
Figure 11:
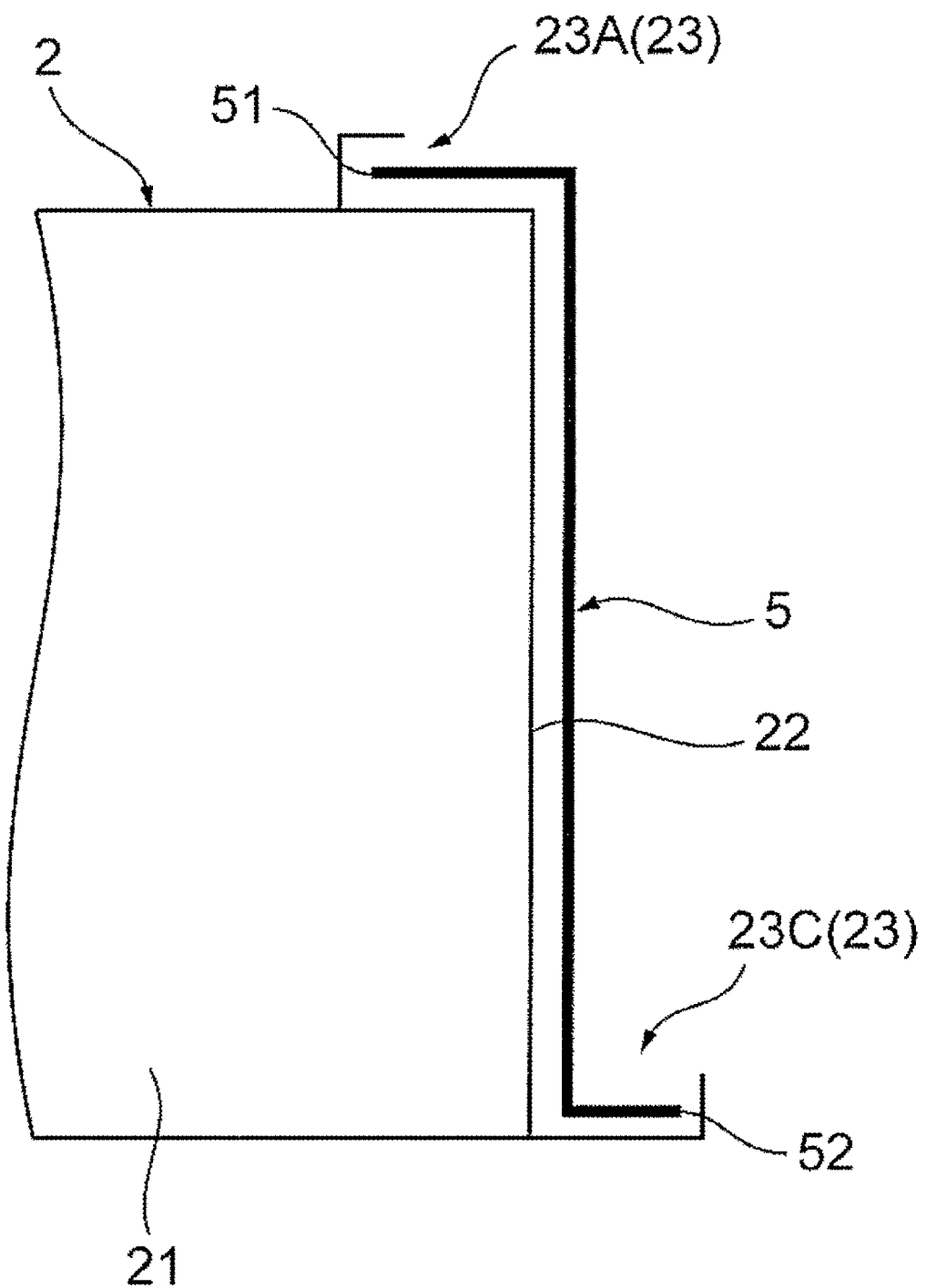
FIG. 11 is a schematic cross-sectional view illustrating a modification of the spacer member and the side plate illustrated in FIG. 8.
Figure 12:
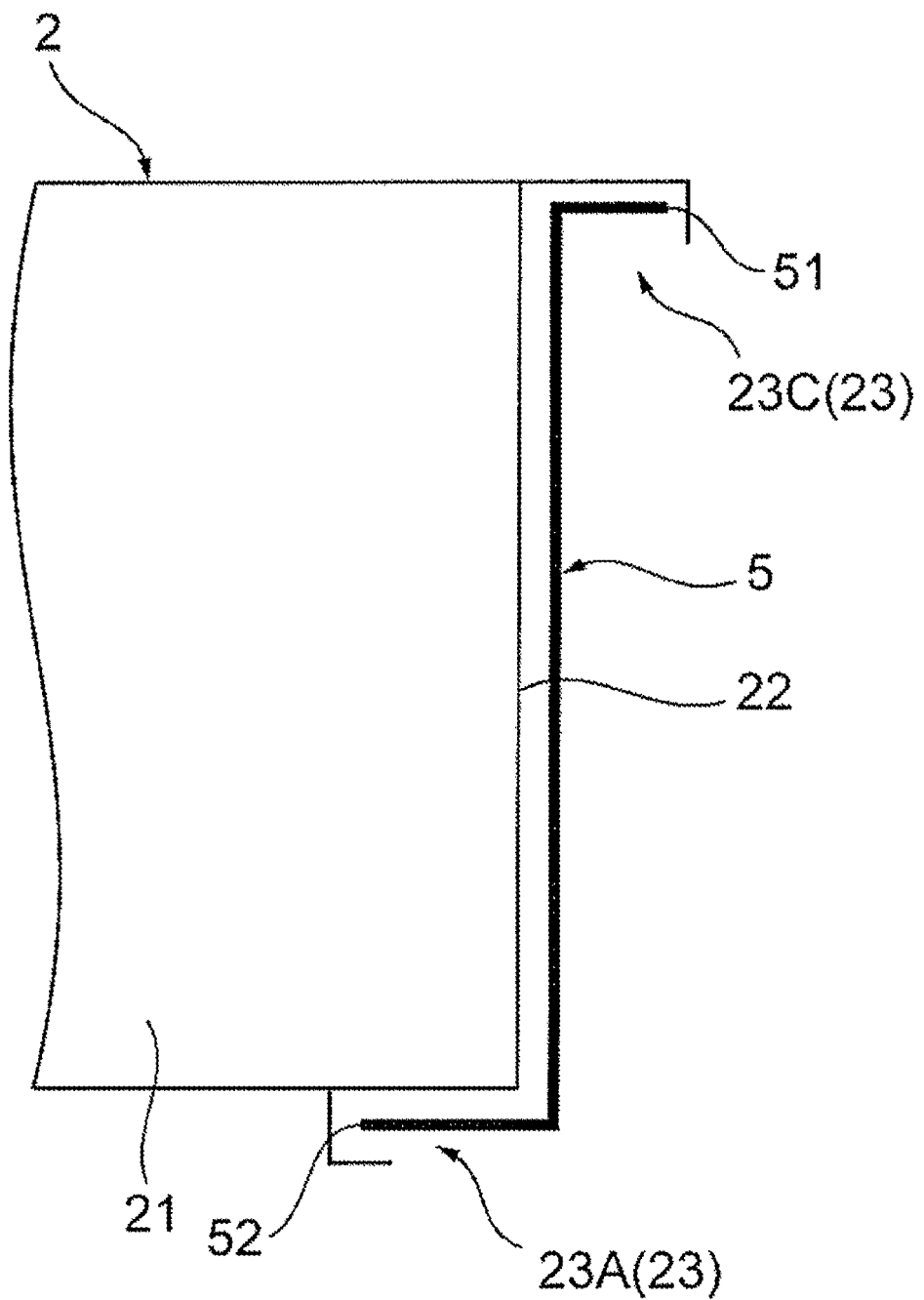
FIG. 12 is a schematic cross-sectional view illustrating a modification of the spacer member and the side plate illustrated in FIG. 8.

As illustrated in FIG. 9 and FIG. 10, the engagement part 23C of the spacer member 2 of the assembled battery according to the present embodiment and the engagement part 23B of the spacer member 2 of the assembled battery according to the first or second embodiment illustrated in any of FIG. 5 to FIG. 7 may be combined. Further, as illustrated in FIG. 11 and FIG. 12, the engagement part 23C of the spacer member 2 of the assembled battery according to the present embodiment and the engagement part 23A of the spacer member 2 of the assembled battery 100 according to the first embodiment illustrated in FIG. 5 and FIG. 6 may be combined.

Fourth Embodiment

Figure 13:
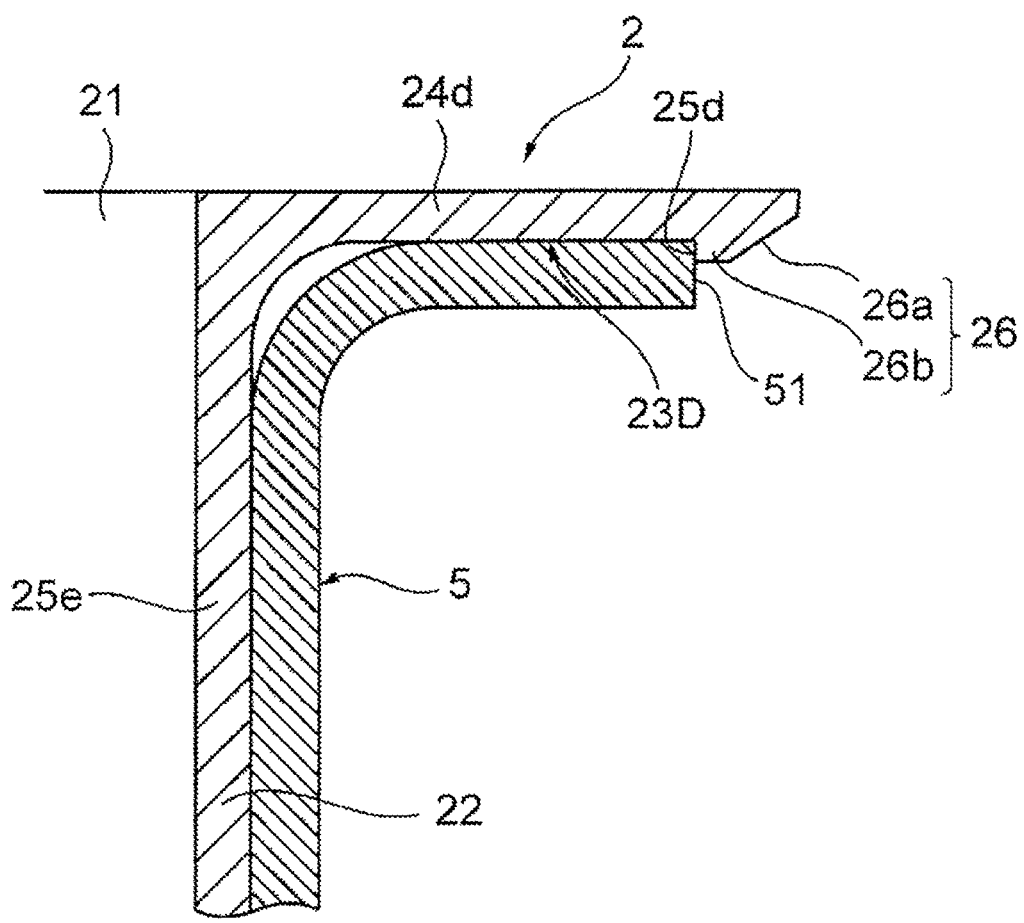
FIG. 13 is a magnified cross-sectional view illustrating an engaged state between a spacer member and a side plate of an assembled battery according to a fourth embodiment of the present invention.
Figure 14:
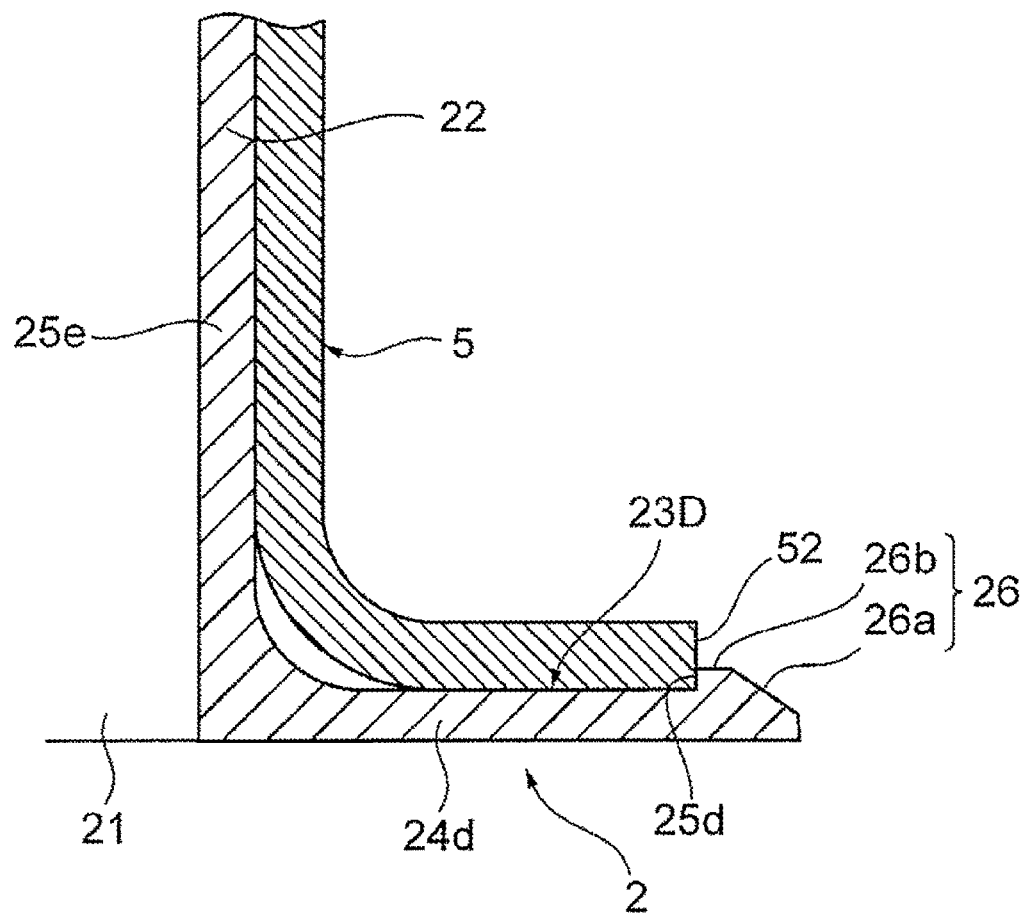
FIG. 14 is a magnified cross-sectional view illustrating an engaged state between the spacer member and the side plate according to the fourth embodiment of the present invention.

Next, an assembled battery according to a fourth embodiment of the present invention is described using FIG. 13 and FIG. 14 with reference to FIG. 1 to FIG. 4 and FIG. 8 to FIG. 12. FIG. 13 and FIG. 14 are cross-sectional views each illustrating an engaged state between the spacer member 2 and the side plate 5 according to the present embodiment, and are magnified views of the part corresponding to the engagement part 23C of the spacer member 2 illustrated in FIG. 8 to FIG. 12.

The assembled battery according to the present embodiment is different from the assembled battery according to the third embodiment illustrated in FIG. 8 to FIG. 12 in that the spacer member 2 illustrated in FIG. 13 and FIG. 14 includes an engagement part 23D with a projection 26. The other points of the assembled battery according to the present embodiment are the same as those of the assembled battery according to the third embodiment; therefore, the description of the same components is omitted by denoting those components with the same reference signs.

As illustrated in FIG. 13 and FIG. 14, the engagement part 23D of the spacer member 2 of the assembled battery according to the present embodiment includes the projection 26 to be engaged with each of the ends 51 and 52 of the side plate 5 corresponding to the plate-shaped member that extends in the stacking direction of the secondary batteries 1. The projection 26 is provided at an end of the wall part 24d of the engagement part 23D that extends to the outside in the width direction of the secondary battery 1 at opposite ends of the second part 22 of the spacer member 2 in the height direction of the secondary battery 1. The projection 26 includes an inclined part 26a that is inclined from an end surface of the wall part 24d to an inside in the width direction of the secondary battery 1 and moreover to a central side in the height direction of the secondary battery 1, and a projection 26b that is adjacent to the inclined part 26a and projects from the wall part 24d to the central side in the height direction of the secondary battery 1.

In the assembled battery according to the present embodiment, the spacer member 2 and the side plate 5 can be engaged with each other in the width direction of the secondary battery 1. Specifically, as the ends 51 and 52 of the side plate 5 that are bent from the outside to the inside in the width direction of the secondary battery 1 are brought closer to the engagement part 23D of the spacer member 2, the corner between the ends 51 and 52 of the side plate 5 and an intermediate part is brought into contact with the inclined part 26a of the projection 26 of the engagement part 23D.

Pushing the side plate 5 further to the inside in the width direction of the secondary battery 1 in this state causes the corner of the side plate 5 to move along the inclined part 26a and thus, the wall part 24d of the engagement part 23D of the spacer member 2 is elastically deformed and expands in the height direction of the secondary battery 1. Then, when the corner and the ends 51 and 52 of the side plate 5 go over the projection 26b of the engagement part 23D, the elastic deformation of the wall part 24d of the engagement part 23D is restored and the ends 51 and 52 of the side plate 5 are engaged with the engagement part 23D.

In this state, the movement of the side plate 5 in the height direction of the secondary battery 1 is restricted by the wall part 24d of the engagement part 23D that faces the end surface in the height direction of the side plate. In addition, the movement of the side plate 5 in the width direction of the secondary battery 1 is restricted by the wall parts 25d that face the ends 51 and 52 of the side plate 5 and the wall parts 25*e* that face the internal side surface of the side plate 5. On the other hand, since the engagement part 23D is open in the stacking direction of the secondary batteries 1 and does not include a wall part that intersects with the stacking direction of the secondary batteries, the side plate 5 is engaged with the engagement part 23D in a manner that the sliding is possible in the stacking direction of the secondary batteries 1.

In the assembled battery according to the present embodiment, what is called a snap-fit structure as described above is employed; thus, it is easy to engage the spacer member 2 and the side plate 5 with each other. In the assembled battery according to the present embodiment, like in the assembled battery 100 according to the first embodiment, the spacer member 2 includes the engagement parts 23D and 23D that are engaged with the side plate 5 corresponding to the plate-shaped member in a manner that the sliding is possible in the stacking direction of the secondary batteries 1. Therefore, by the assembled battery according to the present embodiment, the assembled battery that can be easily assembled and that has high reliability in a manner similar to the assembled battery 100 according to the first embodiment can be provided.

The embodiments of the present invention have been described so far with reference to the drawings; however, specific structures are not limited to these embodiments, and a design change and the like within the scope not departing from the concept of the present invention are included in the present invention. For example, the engagement part of the spacer member may be one of concave parts to be engaged with one of a pair of ends of the plate-shaped member that extends in the stacking direction of the secondary batteries.

REFERENCE SIGNS LIST

1 secondary battery
2 spacer member
5 side plate (plate-shaped member)
100 assembled battery
23 engagement part (concave part)
23A engagement part (concave part)
23B engagement part (concave part)
23C engagement part (concave part)
23D engagement part (concave part)
24*a* wall part
24*b* wall part
24*c* wall part
24*d* wall part
25*a* wall part
25*b* wall part
25*c* wall part
25*d* wall part
25*e* wall part
26 projection
51 end
52 end

The invention claimed is:

1. An assembled battery, comprising:
   secondary batteries with a flat prismatic shape that are stacked in a thickness direction, wherein each of the second batteries is provided with a pair of external terminals at one end in a height direction;
   spacer members that are stacked alternately with the secondary batteries;
   plate-shaped members that extend in a stacking direction of the secondary batteries and face side surfaces of the spacer members along the stacking direction, wherein the spacer member includes engagement parts engaged with the plate-shaped member at both ends in the height direction;
   the engagement parts are groove-like concave parts that extend in the stacking direction with opposite ends open;
   one of the engagement parts, which is provided at one end in the height direction and is located adjacent to the external terminal, is formed to have a groove-like shape with a depth to the inside in a width direction of the secondary battery; and
   one end of the plate-shaped member in the height direction is bent from the height direction to the inside in the width direction and protrudes to a depth direction of said one of the engagement parts and is engaged with said one of the engagement parts.

2. The assembled battery according to claim 1, wherein said one of the engagement parts includes a wall part that intersects with the height direction and faces said one end of the plate-shaped member that is bent in the width direction.

3. The assembled battery according to claim 1, wherein an opposite end of said one end of the plate-shaped member extends straight to the height direction;
   wherein the engagement part, which is provided on the opposite side of said one engagement part in the height direction, includes a wall part that intersects with the width direction and faces said opposite end of the plate-shaped member.

4. The assembled battery according to claim 3, wherein:
   the engagement part, which is provided on the opposite side of said one engagement part in the height direction, is formed to have a groove-like shape with a depth in the height direction.

5. The assembled battery according to claim 1, wherein the plate-shaped members are made of a metal material.

6. The assembled battery according to claim 1, wherein the spacer member is made of resin with an insulating property.

* * * * *